United States Patent [19]

Scamehorn et al.

[11] Patent Number: 4,943,376

[45] Date of Patent: Jul. 24, 1990

[54] SURFACTANT ENHANCED REGENERATION OF HYDROPHOBIC MATERIALS

[76] Inventors: John F. Scamehorn, 701 Grill Ave.; Jeffrey H. Harwell, 331 Skyline, both of Norman, Okla. 73071

[21] Appl. No.: 176,616

[22] Filed: Apr. 1, 1988

[51] Int. Cl.$^5$ .............................................. B01D 15/06
[52] U.S. Cl. ................................... 210/674; 210/694; 502/22; 502/29
[58] Field of Search ...................... 502/22, 23, 28, 29; 210/674, 694

[56] References Cited

U.S. PATENT DOCUMENTS

| | | | |
|---|---|---|---|
| 2,961,413 | 11/1960 | Wendlandt et al. | 502/29 |
| 3,117,936 | 1/1964 | Michalko | 502/28 |
| 3,720,626 | 3/1973 | Benzaria et al. | 210/674 |
| 3,965,036 | 6/1976 | Himmelstein | 502/22 |
| 4,058,457 | 11/1977 | Manes | 502/22 |
| 4,075,281 | 2/1978 | Port et al. | 502/22 |
| 4,131,483 | 12/1978 | Iwahashi et al. | 134/10 |
| 4,260,484 | 4/1981 | Connolly | 210/674 |
| 4,562,165 | 12/1985 | Wilson et al. | 210/674 |
| 4,770,790 | 9/1988 | Oberhofer | 210/674 |

FOREIGN PATENT DOCUMENTS

| | | | |
|---|---|---|---|
| 1251281 | 10/1967 | Fed. Rep. of Germany | 502/29 |
| 53-113287 | 10/1978 | Japan | 502/23 |
| 56-144705 | 11/1981 | Japan | 210/674 |

OTHER PUBLICATIONS

Soffel, Kirk-Othmer Encyclopedia of Chemical Technology, 3rd. ed., vol. 4, pp. 556-570 (John Wiley & Sons 1976).
Hutchins, "Activated-Carbon Systems for Separation of Liquids", Handbook of Separation Techniques for Chem. Eng. (P. A. Schweitzer, Ed.), Sec. 1.13, (McGraw-Hill, New York 1979).
Scamehorn & Harwell, "Surfactant-Based Treatment of Aqueous Process Streams", Surfactants in Chemical/Process Eng. (Marcel Dekker, N.Y. 1988) pp. 77-125.

Primary Examiner—Peter Hruskoci
Assistant Examiner—Cynthia L. Nessler
Attorney, Agent, or Firm—Dunlap, Codding, Peterson & Lee

[57] ABSTRACT

A method of regenerating spent hydrophobic materials, and recovering material sorbed thereon whereby sorbed materials are removed by contacting same with a surfactant solution. The surfactant solution, is of sufficient concentration to form micelles which are aggregates of surfactant molecules with a hydrocarbon-like interior which solubilize a portion of the sorbed material. The resulting solution is removed from the hydrophobic material and the material contained therein separated from the solution. Any residual surfactant on the hydrophobic material may be flushed from the hydrophobic material, if necessary.

21 Claims, 4 Drawing Sheets

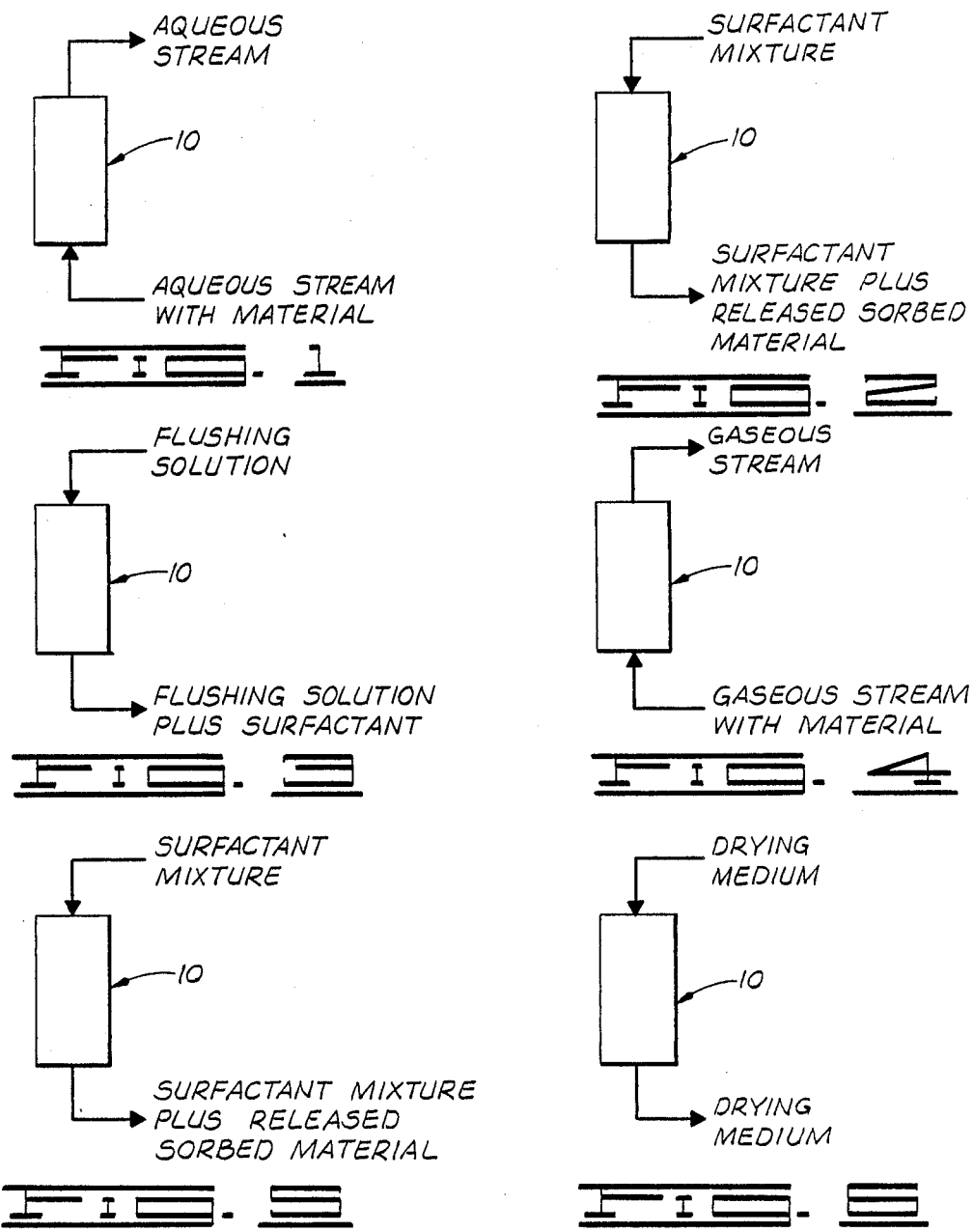

SURFACTANT ENHANCED REGENERATION OF HYDROPHOBIC MATERIALS

FIELD OF THE INVENTION

The present invention generally relates to regeneration of spent activated carbon or other hydrophobic materials and recovery of the material sorbed thereon by a treatment process including the use of surfactants.

SUMMARY OF THE INVENTION

The present invention comprises methods to regenerate spent activated carbon and recover the material sorbed thereon. The spent activated carbon is contacted by a surfactant, preferrably in a medium, containing micelles for a period of time sufficient to release and solubilize a portion of the material. The mixture containing surfactant and the released sorbed material is removed from the activated carbon. Any residual surfactant sorbed on the activated carbon may then be removed by a least one flushing. The released sorbed material may be separated from the mixture for recovery. This method is preferably used for in situ regeneration of activated carbon and recovery of sorbed material from a carbon bed. Although the present invention particularly is described herein with respect to the regeneration of activated carbon, the present invention equally is applicable to other hydrophobic materials such as polymer beads, hydrophobic resins and reverse phase silicas, for example.

BRIEF DESCRIPTION OF THE PREFERRED EMBODIMENTS

FIG. 1 is a diagrammatic view of a vessel containing hydrophobic material for sorbing material contained in an aqueous stream shown being passed through the hydrophobic material.

FIG. 2 is a diagrammatic view showing surfactant being passed through the hydrophobic material for releasing the sorbed material.

FIG. 3 is a diagrammatic view showing a flushing solution being passed through the hydrophobic material for removing surfactant therefrom.

FIG. 4 is a diagrammatic view showing a gaseous stream with material being passed through hydrophobic material for sorbing the material onto the hydrophobic material.

FIG. 5 is a diagrammatic view showing surfactant being passed through the hydrophobic material for releasing the sorbed material.

FIG. 6 is a diagrammatic view showing a drying medium being passed through the hydrophobic material.

DETAILED DESCRIPTION OF THE PREFERRED EMBODIMENTS

Figure 7:
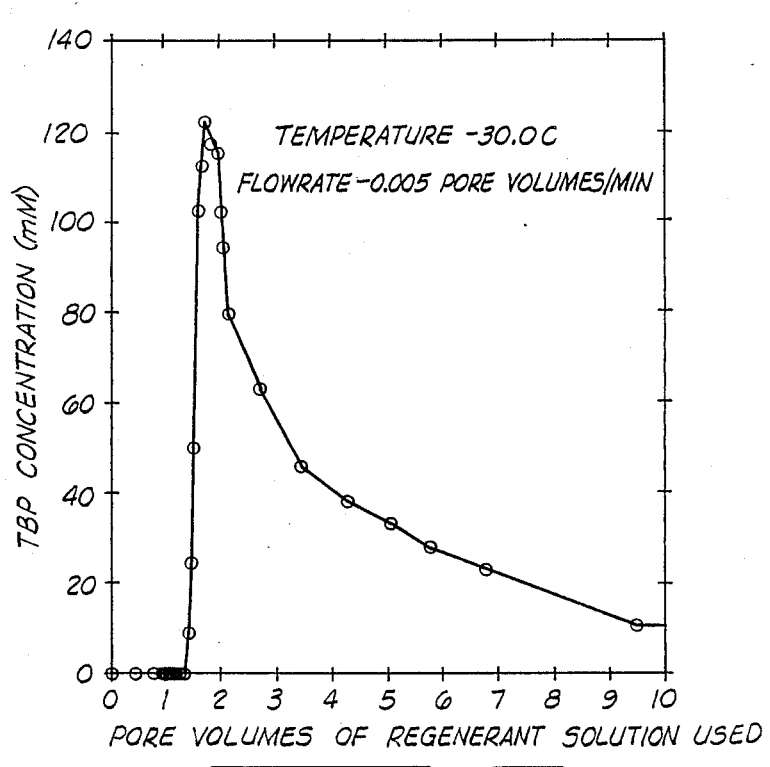
FIG. 7 is a graph showing concentrations of TBP in a column effluent during regeneration.

The adsorbent qualities of activated carbon has promoted its use as a filtering agent for many years. It has been especially useful in the field of clean-up and recovery of organic industrial wastes where the activafed carbon may be used in large fixed beds.

When most of the activated carbon is saturated with sorbed material, the activated carbon loses its ability to filter out material from an aqueous or gaseous stream and must be replaced or regenerated for reuse. The regeneration process involves removal or destruction of the sorbed material. The method of the present invention is well adapted to a non-toxic, inexpensive regeneration of spent activated carbon where the adsorbed organic is recovered, and more particularly, regeneration of a carbon bed in situ.

Often there is a need to recover the sorbed material; sometimes it is valuable and may be reused, or perhaps it is toxic and requires safe disposal. Sometimes the recovery of the sorbed material is sought as part of a process in separating materials. For example, the surfactant and sorbed material in the regenerant solution exiting the beds can be separated from each other to permit reuse of both materials. Accordingly, the method of the present invention is well adapted to a cost effective, non-toxic recovery of the sorbed material.

The method of the present invention involves the use of several elements including the presence of spent hydrophobic material such as activated carbon, either in a carbon bed or as a powdered activated carbon filtered from solution after being spent. As used herein, "spent hydrophobic material" means any hydrophobic material onto which material has been sorbed. The term "material" as used herein means any substance which will sorb onto hydrophobic material, more particularly fairly hydrophobic organic material, such as the phenols. The material sorbed onto the activated carbon (hydrophobic material) goes through two phases: in the first phase, the material is sorbed onto the activated carbon (hydrophobic material) and is therefore referred to as the "sorbed material"; in the second phase, the material is released from the activated carbon (hydrophobic material) and is therefore referred to as the "released sorbed material". The activated carbon in one form is a granular carbon, such as Calgon Filtrasorb 300 from Calgon Corporation of Pittsburgh, Pa., although a powdered carbon could also be used. As used herein, "carbon bed" means an aggregation of activated carbon, for example, a column filled with activated carbon, as more fully discussed hereafter.

The method of the present invention comprises contacting the spent activated carbon having sorbed material sorbed thereon with a surfactant, preferably in a medium. The contact may be by any suitable method such as pouring the surfactant over the activated carbon. Preferably, the activated carbon is in a carbon bed into which the surfactant solution may be dripped or pumped.

As used herein, "surfactant solution" means any medium in which a surfactant is dissolved, preferably in water. Any suitable surfactant or mixture of surfactants may be used in accordance with the present invention. Some of the factors which affect the choice of the more effective surfactant include temperature and the presence of additives in the surfactant solution such as the released sorbed material. For example, at temperatures below the Krafft temperature of the surfactant, anionic surfactants precipitate from the solution and are therefore ineffective. Also, some surfactants form macroemulsions with the released sorbed material and thus cannot be used. The surfactant used in the experimental study discussed hereafter was a cationic surfactant although anionic and nonionic surfactants can be used in the present invention.

At certain concentrations, called critical micelle concentrations, surfactant solutions begin to form micelles. A micelle is an aggregation of normally 50–150 surfactant molecules that has a hydrocarbon-like interior. This interior permits solubilization of substances, such as organic material, which normally has a low solubility in aqueous solutions.

In accordance with the present invention, surfactant solution at the critical micelle concentration or above contacts the sorbed material for a sufficient amount of time in order to release at least a portion of the sorbed material from the activated carbon. A portion of the sorbed material is solubilized within the micelles of the surfactant solution or otherwise released into the surfactant solution. The surfactant solution containing released sorbed material is called the mixture.

The amount of time sufficient to release a portion of the sorbed material into the surfactant is dependent upon several factors some of which are the concentration of the surfactant, the nature of the surfactant or combination of surfactants used, the amount of sorbed material and the amount and arrangement of activated carbon. Preferably, the mixture is drained or flushed with flushing solution as described hereafter from the activated carbon, and, more preferably, from the carbon bed in situ. The time sufficient to release at least a portion of the sorbed material may be determined by sampling the mixture that is drained or the mixture and flushing solution that is flushed from the activated carbon; when the sample no longer contains released sorbed material, a sufficient amount of time has been allowed.

Once the mixture has been removed from the activated carbon, some surfactant may remain on the activated carbon. A portion of the surfactant may be removed from the activated carbon, and preferably from the carbon bed in situ, by at least one flushing with a flushing solution, preferably water. "Flushing" means pouring, dripping, pumping or introducing a flushing solution over the activated carbon by any appropriate means and subsequently draining solutions therefrom. The number of flushes required to remove a portion of the residual surfactant is dependent upon a number of factors, some of which are the type of surfactant used, the amount and arrangement of the activated carbon and the type of sorbed material. The flushing solution can be sampled to monitor the presence of surfactant. When the concentration of surfactant in the flushing solution reaches a sufficiently low concentration, a sufficient number of flushes have been employed. The flushing step may not be necessary in all cases, such as when material is adsorbed onto the hydrophobic material through contact with a gaseous stream containing the sorbed material.

If the sorbed material can be used or is toxic and requires safe disposal, the recovery of the sorbed material may be warranted. The method for recovery of the material sorbed onto the activated carbon comprises contacting the sorbed material for a sufficient time with a surfactant solution at or above the critical micelle concentration in order to release the sorbed material into the surfactant solution, as previously discussed. The resulting regenerant solution is removed from the activated carbon, as previously discussed. The released material then is separated from the regenerant solution by any appropriate method, such as air stripping (if volatile), or foam fraction action.

From the foregoing, it will be appreciated that the method of the present invention offers an advantageous way to regenerate spent activated carbon and recover material sorbed thereon, especially from carbon beds in situ. The use of surfactants in the present invention has many advantages over other means of regenerating activated carbon.

Surfactants are relatively non-toxic to the environment, non-destructive to the activated carbon, and safe to handle. Since some of the surfactant may be emitted in the environment or to sewage systems during the draining or flushing after regeneration, the environmental impact is of concern. Since surfactants are biodegradable and nontoxic, hydrophobic material such as carbon can be regenerated and flushed with water which could be emitted directly into normal water treatment streams.

The present invention is illustrated in FIGS. 1–6.

Shown in FIG. 1 is an aqueous stream containing material which is passed through a vessel 10 containing a bed of hydrophobic material such as activated carbon. The material is sorbed onto the hydrophobic material and the aqueous stream is passed from the vessel 10.

To regenerate the hydrophobic material, the surfactant mixture is passed through the hydrophobic material or, in other words, the hydrophobic material is contacted with the surfactant mixture as illustrated in FIG. 2. The material sorbed onto the hydrophobic material (the sorbed material) is released and the surfactant mixture plus the released sorbed material is passed from the vessel 10.

As illustrated in FIG. 3, a flushing solution is passed through the hydrophobic material to remove any surfactant which may remain on the hydrophobic material. The flushing solution along with the surfactant is removed from the vessel 10.

As mentioned before, the present invention also is useful for removing material sorbed on hydrophobic material from a gaseous stream, as illustrated in FIGS. 4–6.

As shown in FIG. 4, the gaseous stream containing the material is passed through the vessel 10 containing the bed of hydrophobic material. The material is sorbed on the hydrophobic material and the gaseous stream is passed from the vessel 10.

To regenerate the hydrophobic material, the surfactant mixture is passed through the hydrophobic material, as illustrated in FIG. 5. The surfactant mixture plus the released sorbed material is passed from the vessel 10.

With gaseous stream applications, the step of flushing the surfactant from the hydrophobic material optionally may be eliminated if it is believed that the presence of surfactant may not reduce the capacity of the bed of hydrophobic material substantially. However, in these applications, it is necessary to dry the hydrophobic material as illustrated in FIG. 6 wherein drying medium is passed through the hydrophobic material.

EXPERIMENTAL DATA

A. Materials

The specific surfactant chosen for study was 1-hexadecylpyridinium chloride monohydrate or cetyl pyridinium chloride (CPC) from HEXCEL Specialty Chemicals. It had a Krafft temperature of 10.8° C. It was pharmaceutical grade as received, so it was of high purity.

The organic contaminant chosen for study was 4-tert-butylphenol (TBP) from Aldrich Chemical Company. As received, the TBP had a purity of 99%. The TBP was purified by recrystallization first from hexane and then from ethanol and water.

The activated carbon used in this study was Calgon Filtrasorb 300, a granular, liquid-phase carbon. The carbon was boiled rapidly for 4-6 hours and then rinsed several times with deionized water. The remaining salts were subsequently removed from the carbon surface by rinsing the carbon three times, this being repeated every two days, for 15-20 days, until no salts were detected in the rinse water. The carbon was then dried for one week at 100-120° C. Due to the grinding action on the carbon when it was boiled in water, the final mean diameter of the cleaned carbon particles was 1.0-1.2 mm.

B. Methods

1. Regeneration and Flushing of Adsorber Bed

The carbon adsorption bed was a 480.0 ml glass column, 25 mm diameter by 100 mm length, with a maximum pressure rating of 690 kPa, manufactured by Rainin. An adjustable plunger was used to insure that no excess void volume existed in the bed. A water jacket was used to maintain the carbon bed at 30.0° C. A single head pump with a maximum flowrate of 82 ml/min and a maximum pressure of 690 kPa, manufactured by Cole-Palmer was used in this study. For experimental adsorption columns, the ratio of the column diameter to the packing diameter should be at least 20:1. A minimum of 25 mm diameter column has been suggested for granular carbon adsorption bed studies. The adsorption bed used here satisfied these criterion.

In the preparation of the carbon to be used in the actual regeneration, a 205 g carbon sample was boiled in water to completely wet the pores, after which the excess water was decanted. The water/carbon ratio was known at the end of the boiling/decanting step. A known amount of water and 30.0 g of TBP was added to the wet carbon and the mixture was heated to 80° C. to dissolve the TBP in the water. The mixture was then placed in the carbon adsorption column. The TBP solution was recirculated through the carbon adsorption bed at 30.0° C. until equilibrium was reached, as shown by the TBP concentration. As a result, the equilibrium concentration of TBP and the loading on the carbon was known at the start of the regeneration. In this bed, one pore volume (void volume in the bed) equalled 309 ml.

In the regeneration step, a 0.4M solution of CPC was pumped through the column at a flow rate of 1-2 ml/min in a downflow configuration. Therefore, the average residence time of the regenerant solution was about 200 min. Samples of the effluent from the column were collected and the CPC and TBP concentrations measured using HPLC with conductivity and UV detection, respectively.

During the water flush step, water was pumped through the column in a downflow configuration at a flow rate of 1-2 ml/min and samples also taken on a periodic basis and the CPC and TBP concentrations in these samples was measured as in the regeneration step.

TEST IN AN ADSORPTION COLUMN

A. Regeneration

The concentration of TBP in the solution in equilibrium with the carbon bed was 13 micromolar prior to regeneration. The loading on the simulated spent carbon was 0.146 g TBP/g dry carbon. Therefore, this represents a spent carbon adsorber which has been used to remove TBP from a feed solution containing 13 micromolar TBP. Under these conditions, 32,000 pore volumes of wastewater could have been cleaned up by the bed.

Figure 8:
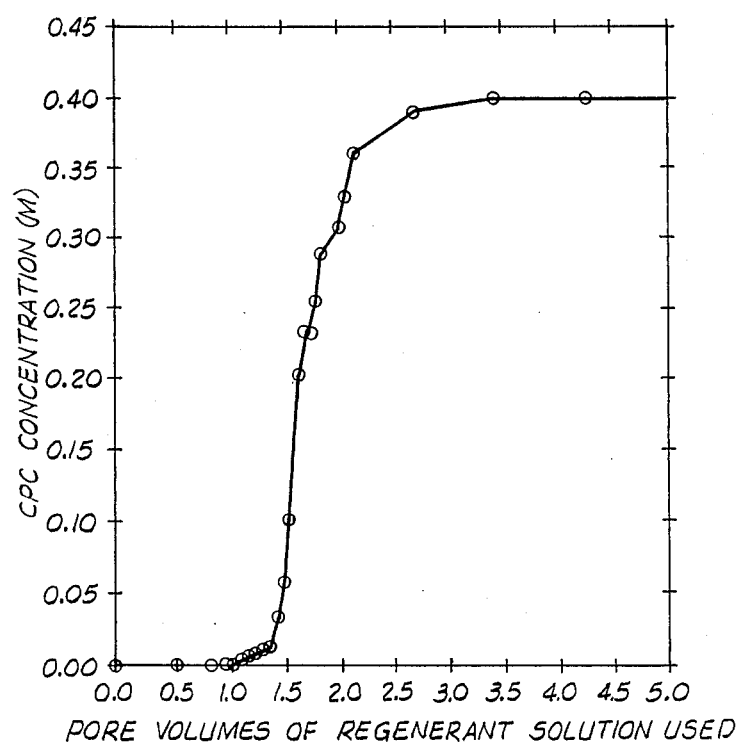
FIG. 8 is a graph showing concentrations of CPC in the column during regeneration.
Figure 9:
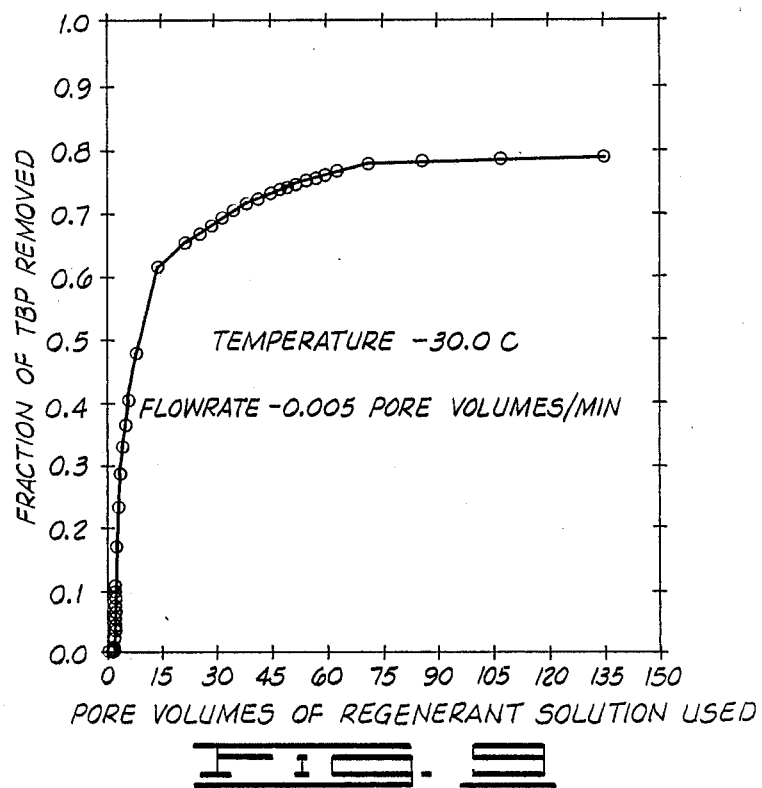
FIG. 9 is a graph wherein the TBP concentrations have been converted into fractional recoveries.

The concentrations of TBP and of CPC in the column effluent during regeneration are shown in FIGS. 7 and 8, respectively. The TBP concentrations are converted into fractional recoveries in FIG. 9. From FIG. 7, the TBP concentration in the bed effluent was extremely high, reaching 0.122M when it first appeared. It then declined as the regeneration step proceeded. From FIG. 9, after 10 pore volumes of regenerant solution had emitted from the column, 48% of the TBP had been removed. The ratio of the volume of wastewater which the carbon could have treated to that of the regenerant solution at 10 pore volumes of regenerant solution is 3300. After 160 pore volumes, 79.4% of the TBP had been removed. The ratio of the volume of wastewater which the carbon could have treated to that of the regenerant solution at 160 pore volumes of regenerant is 205. Therefore, 48% of the TBP had been regenerated from the column when only 0.03% of the volume of wastewater which could be originally treated is used in the regeneration. The TBP in the regenerant solution at this point is 20.4 mM or 1574 times as concentrated as in the original wastewater treated. Similarly, 79.4% of the TBP had been regenerated from the column when only 0.487% of the volume of wastewater which was originally treated is used in the regeneration. The TBP in the regenerant solution at this point is 2.11 mM or 162 times as concentrated as in the original stream treated.

The difficulty in removing the last about 20% of adsorbate is due to this fraction of adsorbate being chemisorbed instead of physically adsorbed as has been shown by subsequent experiments. The organic which is chemisorbed on the carbon is irreversibly adsorbed. The 20% of TBP remains on the carbon during subsequent regenerations. Hence, after 166 pore volumes, almost 100% of the reversibly adsorbed solute (the only kind of concern) was removed. During subsequent regenerations, nearly 100% of the solute was removed in less than 200 pore volumes.

Even if removal of some residual portion of the adsorbate from the carbon is very difficult, this might reduce the efficiency of the operation very little if appropriate process configurations are used. The flow of the wastewater through the carbon bed can be in opposite direction to that of the regenerant solution and flush solution. The water stream leaving the carbon bed would then be exposed to the freshest carbon (that which was regenerated most efficiently) just before leaving the bed. The net effect could be very little reduction in final adsorption capacity after this regeneration process.

B. Water Flush

Figure 10:
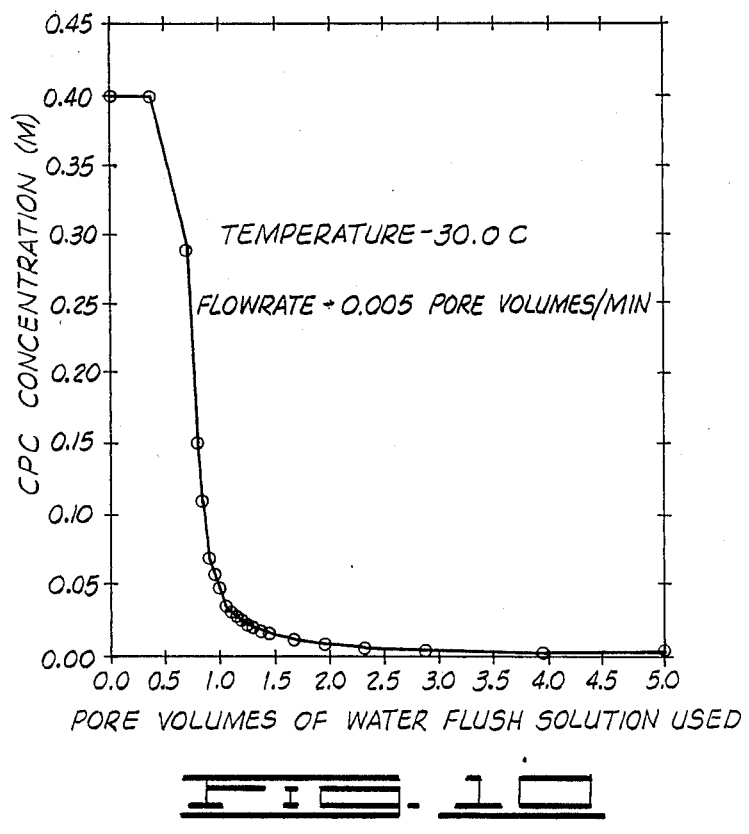
FIG. 10 is a graph showing CPC concentrations in the flush solution.
Figure 11:
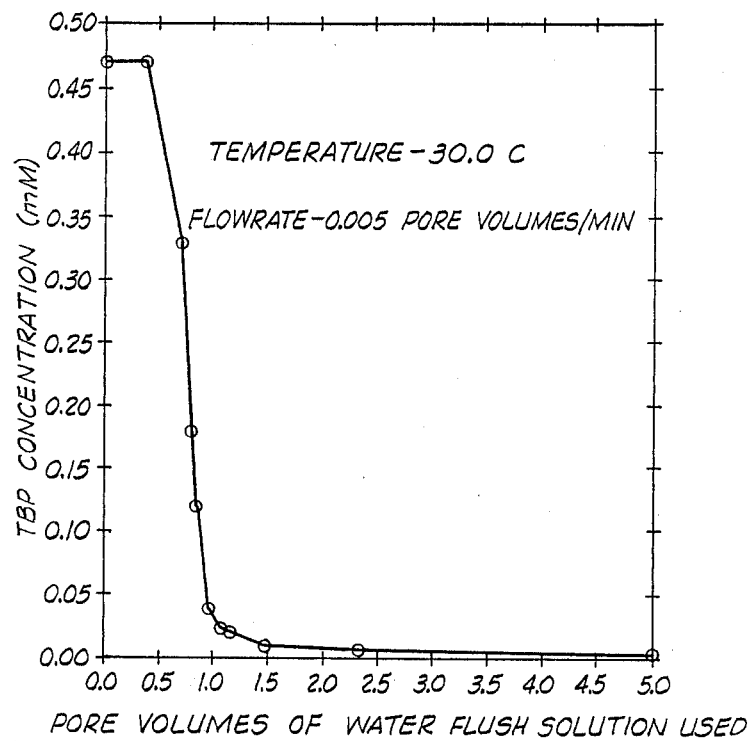
FIG. 11 is a graph showing TBP concentrations in the flush solution.
Figure 12:
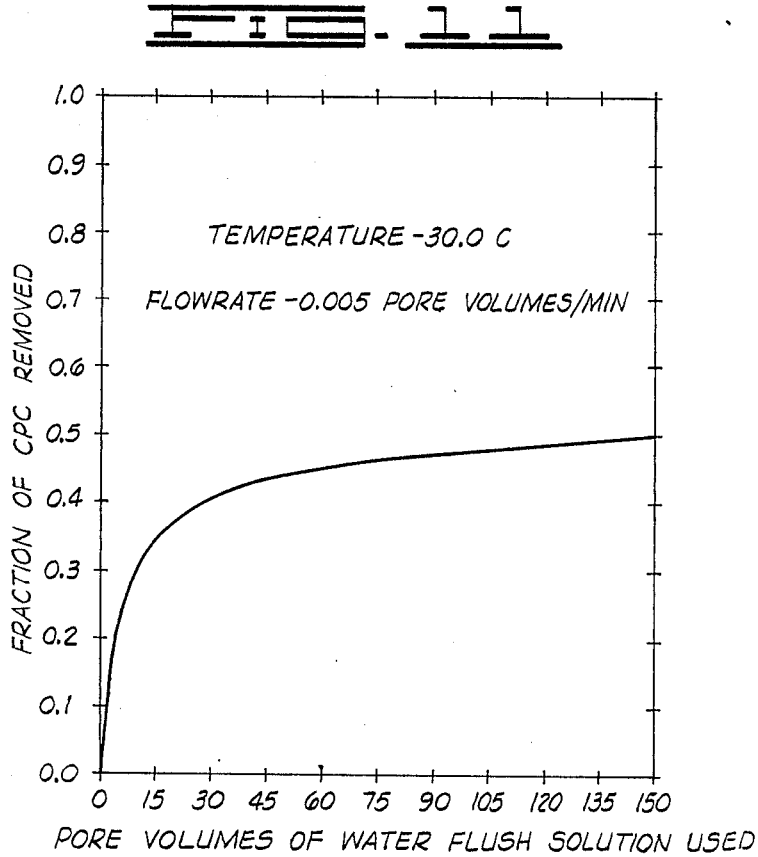
FIG. 12 is a graph showing the fractional removal of CPC during flushing.

After approximately 160 pore volumes of surfactant solution had been passed through the bed, the flush step was initiated. The concentrations of CPC and TBP in the flush solution are shown in FIGS. 10 and 11, respectively. The fractional removal of CPC during the flush is shown in FIG. 12. Both the effluent CPC and TBP concentrations decrease rapidly as the flush step proceeds. After the use of 10 pore volumes of flush solution, 26% of the residual CPC was released from the carbon; after 160 pore volumes, 51% of the residual CPC was released from the carbon. After 1460 pore volumes, the effluent still contained 40 micromolar CPC. Although the amount of residual TBP adsorbed on the carbon after the regeneration is unknown, the concentration of TBP in the effluent has a similar profile to that of the CPC (FIGS. 10 and 11). This would imply that adsolubilization may be a major mechanism of entrapment of TBP after regeneration and that the TBP is removed from the carbon roughly in proportion to the CPC.

The conclusion concerning the flushing step is similar to that concerning the regeneration step, namely that the removal of the bulk of the residual of the adsorbed material can be achieved with a relatively small volume of solution. However, removal of the last portion of the residual material when virgin carbon is used can require large quantities of flushing water.

The fraction of the surfactant being chemisorbed, as opposed to physically adsorbed, may be the cause of this effect, as was shown for the analogous step in the regeneration. If true, the removal of essentially all of the surfactant adsorbed during the regeneration during the subsequent flushing may be possible, for cycles after the first one which was studied here, as has been confirmed experimentally. Also, other surfactants may not adsorb as much as CPC on the carbon, minimizing the importance of the flush step.

Changes may be made in the steps or in the sequence of steps of the methods described herein without departing from the spirit and scope of the invention as defined in the following claims.

We claim:

1. A method for treating hydrophobic material having sorbed material sorbed thereon to remove sorbed material therefrom, comprising the step of:
   contacting the hydrophobic material having sorbed material thereon with a surfactant solution consisting essentially of a surfactant and water with a surfactant concentration of at least a critical micelle concentration so at least a portion of the sorbed material is solubilized and thereby released from the hydrophobic material, thereby leaving the hydrophobic material containing less sorbed material and a mixture comprising the surfactant and a released sorbed material.

2. The method of claim 1 in which the sorbed material is an organic material.

3. The method of claim 1 in which the hydrophobic material is activated carbon.

4. The method of claim 1 wherein the surfactant is a surfactant selected from the group consisting of anionic, cationic or nonionic surfactants or mixtures thereof.

5. The method of claim 4 further comprising the step of separating the released sorbed material from the mixture.

6. The method of claim 1 further comprising the step of removing at least a portion of the mixture from the hydrophobic material.

7. The method of claim 6 in which the step of removing at least a portion of the mixture from the hydrophobic material comprises flushing the hydrophobic material and the mixture with a flushing solution and draining at least a portion of the mixture and flushing solution from the hydrophobic material.

8. The method of claim 7 in which the flushing solution comprises water.

9. The method of claim 6 in which the step of removing at least a portion of the mixture from the hydrophobic material is defined further as comprising draining at least a portion of the mixture from the hydrophobic material.

10. The method of claim 9 further comprising flushing the hydrophobic material after at least a portion of the mixture has been drained therefrom with a flushing solution and draining at least a portion of the flushing solution from the hydrophobic material to remove residual surfactant from the hydrophobic material.

11. The method of claim 10 in which the flushing solution comprises water.

12. A method for treating hydrophobic material having sorbed material sorbed thereon to remove the sorbed material therefrom wherein the hydrophobic material is disposed in a vessel, comprising the steps of:
   passing a surfactant solution into the vessel wherein the surfactant solution consists essentially of a surfactant and water with a surfactant concentration of at least a critical micelle concentration; and
   contacting the hydrophobic material having sorbed material thereon with the surfactant so at least a portion of the sorbed material is solubilized and thereby released from the hydrophobic material, thereby leaving the hydrophobic material containing less sorbed material and a mixture comprising the surfactant and a released sorbed material.

13. The method of claim 12 in which the sorbed material is an organic material.

14. The method of claim 12 in which the surfactant is a surfactant selected from the group consisting of anionic, cationic or nonionic surfactants or mixtures thereof.

15. The method of claim 12 wherein the hydrophobic material is activated carbon.

16. The method of claim 12 further comprising the step of removing at least a portion of the mixture from the hydrophobic material.

17. The method of claim 16 in which the step of removing at least a portion of the mixture from the hydrophobic material comprises flushing the hydrophobic material and the mixture with a flushing solution and draining at least a portion of the mixture and flushing solution from the hydrophobic material.

18. The method of claim 17 in which the flushing solution comprises water.

19. The method of claim 16 in which the step of removing at least a portion of the mixture from the hydrophobic material is defined further as comprising draining at least a portion of the mixture from the hydrophobic material.

20. The method of claim 19 further comprising flushing the hydrophobic material after at least a portion of the mixture has been drained therefrom with a flushing solution and draining at least a portion of the flushing solution from the hydrophobic material to remove residual surfactant from the hydrophobic material.

21. The method of claim 20 in which the flushing solution comprises water.

* * * * *